June 6, 1950 R. R. LAW 2,510,344
VIEWING SCREEN
Filed March 17, 1945
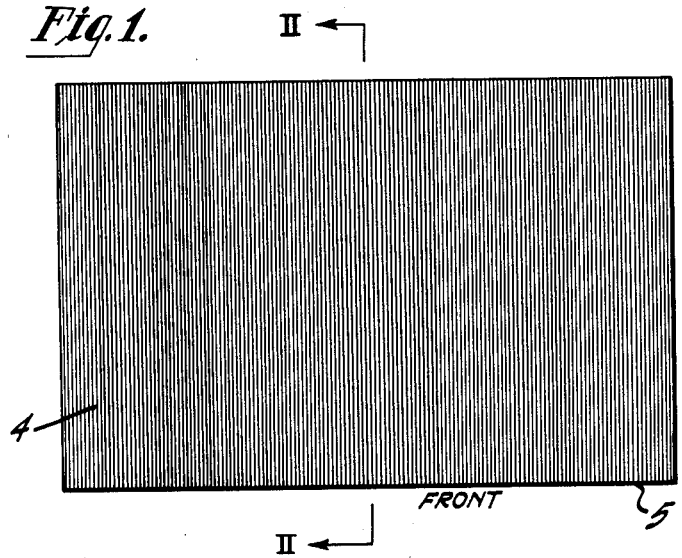
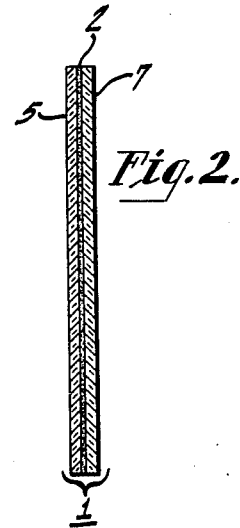
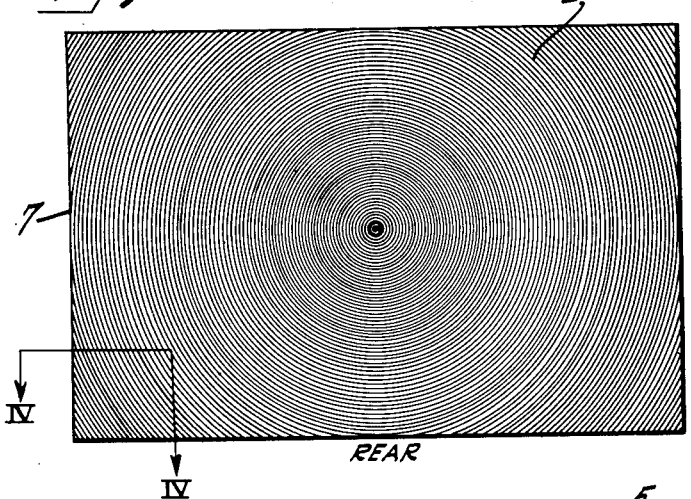
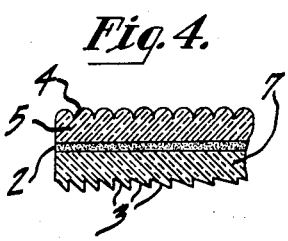
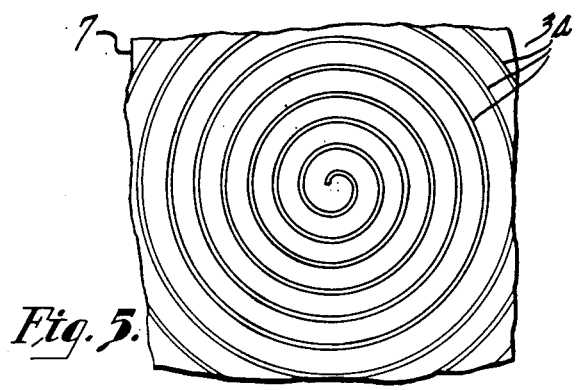
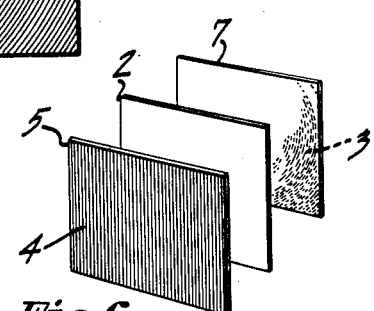
INVENTOR.
RUSSELL R. LAW
BY
ATTORNEY Patented June 6, 1950

2,510,344

UNITED STATES PATENT OFFICE 2,510,344

VIEWING SCREEN

Russell R. Law, Princeton, N. J., assignor to Radio Corporation of America, a corporation of Delaware Application March 17, 1945, Serial No. 583,356

4 Claims. (Cl. 88—28.93)

This invention relates to improvements in viewing screens and has special reference to improvements in translucent screens for optical projection systems employing wide-angle lenses and systems wherein the "throw" is of the same order of magnitude as the diagonal of the screen.

If a ground-glass or other known type of translucent screen is used in an optical projection system employing wide-angle lenses, or one wherein the "throw" is of the same order of magnitude as the diagonal of the screen, the projected image on the screen will usually exhibit a "hot spot," i. e., it will glare at the center and there will be insufficient light in other parts of the image. It might appear that this objection to ordinary projection screens might be obviated by incorporating a conventional condenser lens in the associated optical system. Such, indeed, is the case. However, the use of a conventional condensing lens would not only reduce the quantity of light available at the screen but would also confine the light to a narrow angle which, though satisfactory in the vertical direction, would be too narrow for satisfactory viewing by an audience of more than a few people.

Accordingly, the principal object of the present invention is to provide an improved projection screen and one which obviates the foregoing and other less apparent objections to present day translucent screens.

A related object of the present invention is to provide a projection screen which, when employed in conjunction with an optical system wherein the "throw" is of the same order of magnitude as the diagonal of the screen, will provide images which are free from "hot spots" and have substantially uniform illumination throughout a relatively wide viewing range.

Another and specific object of the present invention is to provide a translucent viewing screen which shall operate to confine the light to a narrow angle in the vertical direction and distribute the light over a wide angle in the horizontal direction, i. e., in the direction of the audience.

Another object of the invention is to provide a translucent viewing screen which shall be relatively free from moiré and other interference patterns.

Another and important object of the present invention is to achieve the foregoing objects in an economical and facile manner, whereby screens embodying the invention may be incorporated in television receivers and moving picture machines within the price range of the average home audience.

Other objects and advantages, together with certain preferred details of construction will be apparent and the invention itself will be best understood by reference to the following specification and to the accompanying drawing wherein:

Figure 1 is a front elevation of a translucent viewing screen constructed in accordance with the present invention, Figure 2 is a sectional view taken under line II—II of Fig. 1, Figure 3 is a rear elevation of the viewing screen of Figs. 1 and 2, Figure 4 is an enlarged sectional view taken on the lines IV—IV of Fig. 3, Figure 5 is an enlarged fragmentary elevation showing an alternative construction for the rear surface of the screen, and Figure 6 is an exploded view of the screen of Figs. 1 to 5, showing its laminated construction.

The foregoing and other objects are achieved in accordance with the invention by the provision of a screen 1 preferably constituted of light weight plastic materials, and containing a light diffusing surface or material 2. The screen is provided on its rear surface with a Fresnel "lighthouse" lens design of concentric circles 3 and has a multiplicity of closely spaced vertical ribs 4 on its front or viewing side.

The concentric rings or risers 3 on the back of the screen act as a condensing lens and eliminate the tendency which the screen would normally have to develop a "hot spot" resulting in glare in the center and insufficient light in the other parts of the image. These rings 3 may comprise discrete circles (as shown in Fig. 3) impressed in the plastic material as by a molding operation or, as shown at 3a in Fig. 5, may comprise a single continuous spiral rib similarly impressed upon the rear surface. The multiplicity of minute vertical ribs 4 on the viewing surface are cylindrical lens elements which serve to distribute the light emanating from the screen over the desired angle in the horizontal direction. For example, to provide a horizontal distribution of 50°, the cylindrical lens elements should have a width to radius-of-curvature ratio of about 0.75 if the index of refraction of the material is 1.5. The light is thus used most efficiently since it is concentrated in the direction of the audience and but little is lost on the floor or ceiling.

The light diffusing surface or material 2 which is interposed between the front and the rear surfaces of the screen serves to distribute the light over the desired relatively narrow angle in the vertical direction and eliminates, or at least reduces, the moiré interference patterns which would otherwise appear due to the juxtaposition of the vertical line pattern and the concentric ring or Fresnel pattern.

As shown more clearly in Figs. 2, 4 and 6, the screen 1 is preferably of laminated construction, in which case, it may comprise three light transmitting supports or sheets 5, 2 and 7 of similar dimensions and bonded together by the application of heat and pressure. These supports 5, 2 and 7 may be constituted of glass but are preferably formed of light weight plastic materials of suitable optical properties. Thus, the front and rear supports 5 and 7 upon which the ribs 4 and circles 3 (or loops 3a) are respectively impressed may be constituted of methyl methacrylate resin, cellulose acetate or other transparent material, and the center piece or diffusing surface 2 may be composed of any suitable opalescent material such, for example, as gelatin or gelatin paper. By way of modification the viewing screen may be composed of a single sheet of opalescent material upon which the lenses are embossed directly. If the screen is to be employed in a projection system for a television receiver (see Landis Patent 2,273,801) the screen will ordinarily be of the dimensions (i. e. 16 x 22 or 18 x 24 inches) now standard for home television receivers.

As previously indicated the concentric rings 3 (or 3a) which are impressed in the rear surface of the screen are designed to act as a condensing ("lighthouse") lens of the Fresnel type. Accordingly, these grooves are preferably of the stepped construction shown in Fig. 4 wherein it will be observed that the inclined surface of the outermost riser is inclined at an angle of about 45° with respect to the horizontal. The other risers are of progressingly decreasing slopes as they approach the common center of the rings and screen. The ring pattern should comprise at least twenty-five rings or turns per inch. Forty rings per inch have been found satisfactory, though for optimum performance the maximum possible number should be used. Similarly, the front surface of the screen should be provided with the maximum possible number of vertical ribs. Usually, more than fifty vertical ribs per inch should be provided on the front surface of the screen while one hundred per inch ensures that the ribs shall not be visible under the conditions encountered in the average home audience.

It will now be apparent that the present invention provides an improved projection-type viewing screen and one suitable for use in conjunction with an optical system wherein the throw is of the same order of magnitude as the diagonal of the screen.

What is claimed is:

1. A projection screen comprising a light-transmitting member of substantially uniform thickness throughout and having (a) a rear surface comprising a substantially plane "lighthouse" lens, (b) a front surface consisting of a multiplicity of parallelly arranged vertical ribs, and (c) a light-diffusing material between said front and rear surfaces.

2. The invention as set forth in claim 1 and wherein said "lighthouse" lens comprises a ring-like pattern containing at least fifty curved ribs per linear inch.

3. A projection screen comprising a light-transmitting member having front and rear surfaces and being of substantially uniform overall thickness throughout, said rear surface having a Fresnel lens formed therein, said Fresnel lens consisting of a multiplicity of substantially concentric stepped grooves the risers of which are of progressively decreasing slope toward the common center, and said front surface having formed therein a multiplicity of vertical ribs constituting cylindrical lens elements, the focal lengths of said cylindrical elements being so chosen that light transmitted through said screen is caused to be substantially concentrated within a predetermined viewing angle in the horizontal direction with consequent gain in brightness, and a layer of opalescent material interposed between said front and rear surfaces for (a) spreading the light over a desired relatively narrow angle in the vertical direction and (b) minimizing the moiré interference pattern which would otherwise be present as an incident to the juxtaposition of said Fresnel and vertical rib surfaces.

4. The invention as set forth in claim 3 and wherein said front surface of said screen contains at least fifty vertical ribs per inch.

RUSSELL R. LAW.

REFERENCES CITED

The following references are of record in the file of this patent:

UNITED STATES PATENTS

| Number | Name | Date |
| --- | --- | --- |
| 1,572,236 | Frederick | Feb. 9, 1926 |
| 2,124,587 | Morrissey | July 26, 1938 |
| 2,132,405 | Draeger | Oct. 11, 1938 |
| 2,141,746 | Gray | Dec. 27, 1938 |
| 2,200,646 | Strong et al. | May 14, 1940 |
| 2,279,555 | Browne et al. | Apr. 14, 1942 |
| 2,338,654 | MacNeille | Jan. 4, 1944 |

FOREIGN PATENTS

| Number | Country | Date |
| --- | --- | --- |
| 670,611 | Germany | June 23, 1939 |
| 158,493 | Austria | Apr. 10, 1940 |